US005785341A

United States Patent [19]
Fenton

[11] Patent Number: 5,785,341
[45] Date of Patent: Jul. 28, 1998

[54] PNEUMATIC ISOLATOR STABILIZING ASSEMBLY

[75] Inventor: E. Dale Fenton, Columbia, Mo.

[73] Assignee: Advance Designed Systems, Inc., Fulton, Mo.

[21] Appl. No.: 789,646

[22] Filed: Jan. 27, 1997

[51] Int. Cl.$^6$ .................................................. B62D 53/06
[52] U.S. Cl. .................... 280/441; 280/407.1; 280/423.1; 267/64.27; 267/35
[58] Field of Search .................... 267/3, 6, 35, 64.19, 267/64.21, 64.23, 64.25, 64.27, 217, 218, 224, 256; 280/405.1, 407.1, 425.2, 439, 441, 483, 711, 788, 789, 423.1

[56] References Cited

U.S. PATENT DOCUMENTS

| 3,494,632 | 2/1970 | Bostrom | 280/407.1 |
| 3,776,573 | 12/1973 | Paielli | 280/407.1 |
| 3,861,716 | 1/1975 | Baxter et al. | 280/423.1 |
| 4,566,716 | 1/1986 | Modat | 280/439 |
| 4,580,806 | 4/1986 | Kolstad et al. | 280/441 |
| 5,328,198 | 7/1994 | Adams | 280/439 |
| 5,388,849 | 2/1995 | Arsenault et al. | 280/407.1 |
| 5,403,031 | 4/1995 | Gottschalk et al. | 280/711 |

Primary Examiner—Robert J. Oberleitner
Assistant Examiner—Chris Schwartz
Attorney, Agent, or Firm—Trexler, Bushnell, Giangiorgi & Blackstone, Ltd.

[57] ABSTRACT

A novel pneumatic isolator stabilizing assembly is provided for use with a tow vehicle and a trailer for improving ride characteristics for a driver and passengers and for minimizing the possibility of damage to the tow vehicle and the trailer. The assembly includes a frame, structure for attaching the frame to the tow vehicle, structure for attaching the frame to the trailer, and an air spring for providing a cushion between the tow vehicle and the trailer when traveling over the roads. In one embodiment, the air spring is offset from the attachment point of the frame to the trailer and in another embodiment, the air spring is generally vertically aligned with this attachment point. The frame in each embodiment includes a first subassembly fixed relative to the trailer and a second subassembly fixed relative to the tow vehicle. The subassemblies are connected together such that they can move relative to each other. The air spring is provided between the subassemblies such that when relative movement is effected in response to movement by the tow vehicle and trailer over obstructions in the road, the air spring provides a cushion between the tow vehicle and the trailer to compensate for various load conditions.

9 Claims, 5 Drawing Sheets

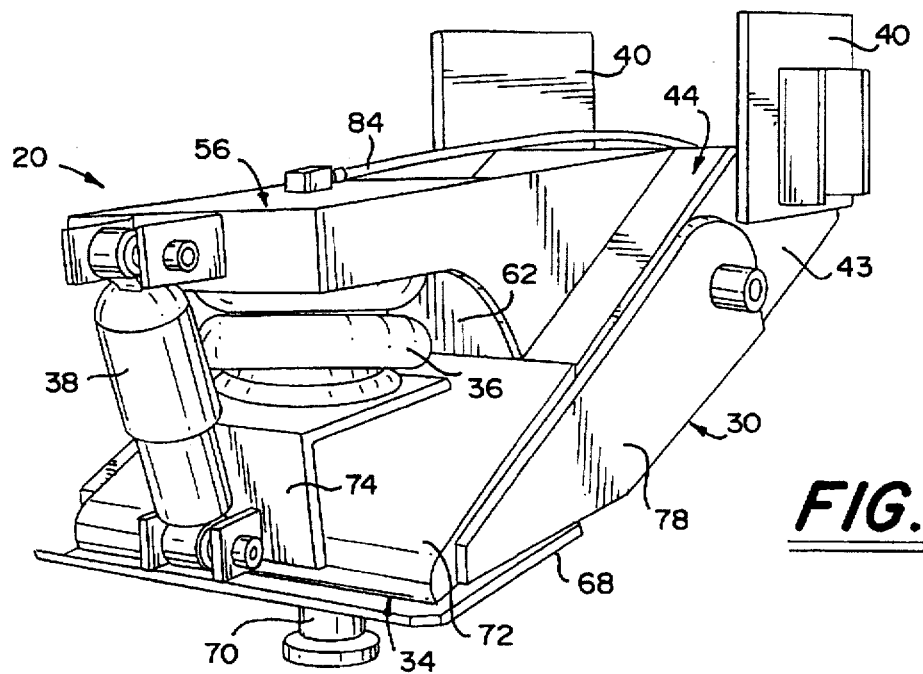
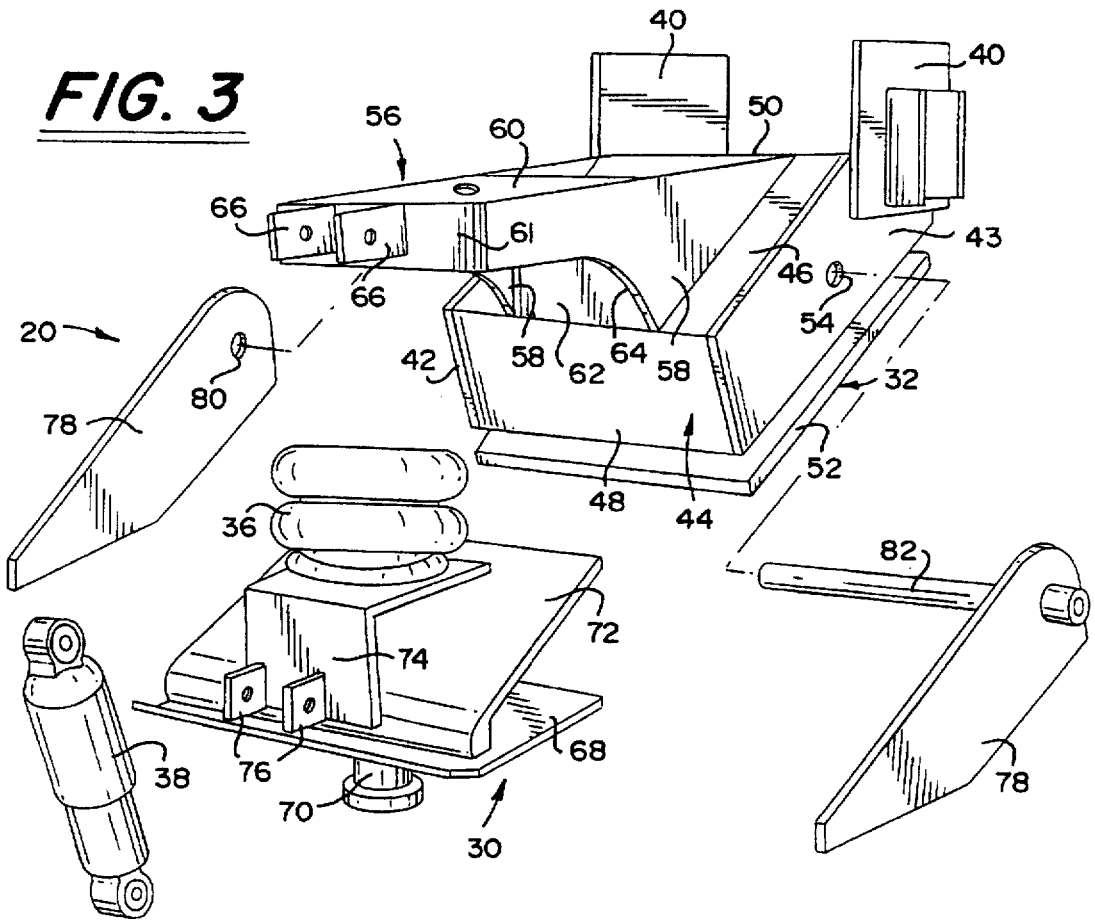

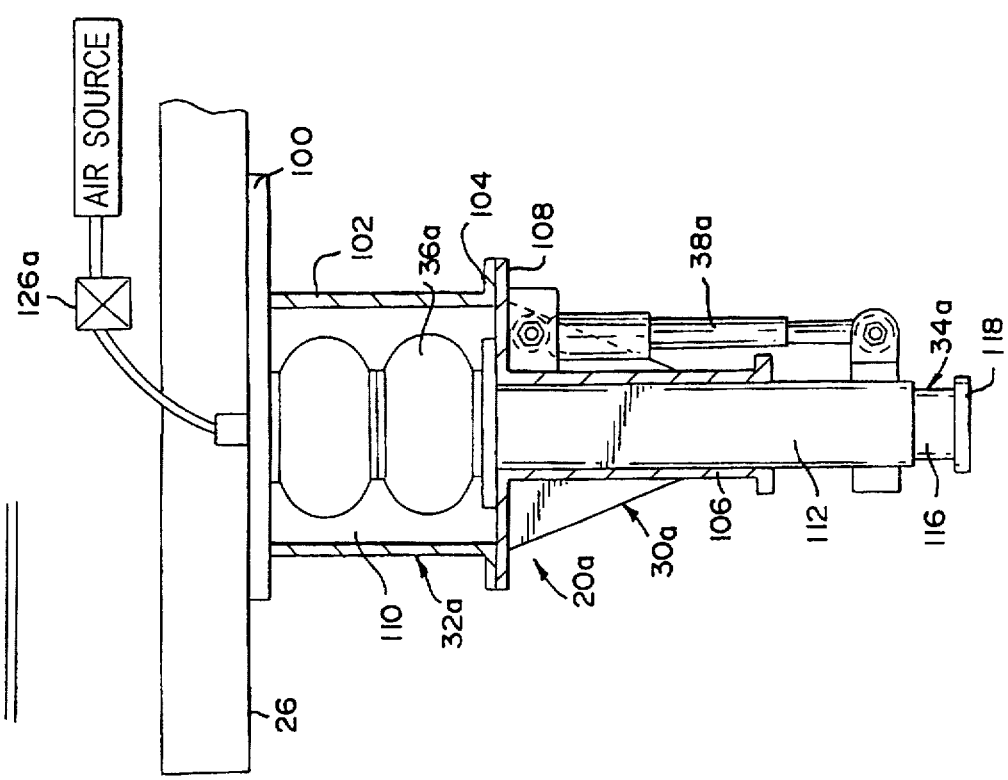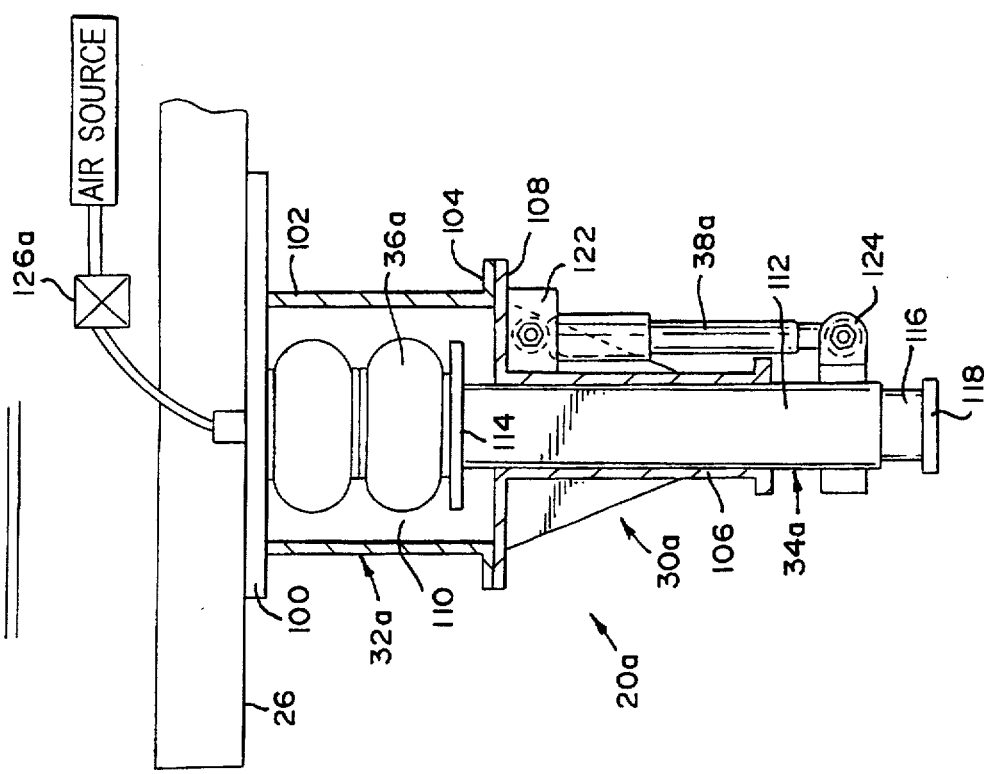

PNEUMATIC ISOLATOR STABILIZING ASSEMBLY

BACKGROUND OF THE INVENTION

This invention is generally directed to a novel pneumatic isolator stabilizing assembly which is incorporated between a tow vehicle, such as a pick-up truck, and a trailer, such as a camper or a horse trailer. The pneumatic isolator stabilizing assembly of the present invention compensates for various load conditions when towing a heavy trailer or an empty trailer over the roads. The assembly of the present invention can be set to soften the contact between the hitch point on the tow vehicle and the trailer, thereby resulting in less impact to the tow vehicle or trailer and reducing potential damage. This smooths the ride for the driver of the tow vehicle and provides passenger comfort.

Current hitch assemblies merely provide a rigid interconnection between the tow vehicle and the trailer without providing for the adjustment for various load conditions of the trailer during travel over the roads. This can create discomfort for the driver and passenger when towing a trailer.

For example, when the tow vehicle and trailer are on a rough road, the tow vehicle and trailer contact obstructions in the road, such as bumps or pot holes, at different times, however, the obstructions cause both the tow vehicle and the trailer to react. When the tow vehicle drives over a bump, the rear of the tow vehicle is lifted, causing the front end of the trailer to lift because the rigid interconnection provided by the hitch assembly. Once the tow vehicle is over the bump, the wheels of the trailer must still traverse the bump which causes the front end of the trailer to lower and "slam down" on the rear end of the tow vehicle because the tow vehicle and the trailer are rigidly interconnected. This results in shocks to the tow vehicle and trailer when the trailer "slams down" on the tow vehicle. An opposite reaction occurs when the tow vehicle and trailer are driven over a pot hole in the road.

The present invention provides a novel solution to this problem by providing a novel adjustable pneumatic isolator stabilizing assembly between the tow vehicle and the trailer. The assembly of the present invention minimizes the amount of shocks on the tow vehicle and trailer which results from the tow vehicle and trailer traveling over unimproved roads.

OBJECTS AND SUMMARY OF THE INVENTION

A general object of the present invention is to provide a novel pneumatic isolator stabilizing assembly which is incorporated between a tow vehicle, such as a pick-up truck, and a trailer, such as a camper or a horse trailer, which compensates for various load conditions when towing a heavy trailer or an empty trailer over the roads.

Another object of the present invention is to provide a novel pneumatic isolator stabilizing assembly which can be set for different conditions to soften the contact between the hitch point on the tow vehicle and the trailer, thereby resulting in less impact to the tow vehicle and trailer and reducing potential damage.

Yet another object of the present invention is to provide a novel pneumatic isolator stabilizing assembly which smooths the ride for the driver of the tow vehicle and provides for passenger comfort.

Briefly, and in accordance with the foregoing, the present invention discloses a pneumatic isolator stabilizing assembly for use with a trailer and a tow vehicle for improving ride characteristics for a driver and passengers. The assembly includes a frame, structure for attaching the frame to the trailer, structure for attaching the frame to the tow vehicle, and an air spring, such as an air bag, mounted on the frame for providing a cushion between the tow vehicle and the trailer when traveling over the roads. Air for the air spring is supplied by an air compressor or from an external air source.

In a first embodiment of the assembly, the air spring is offset from the attachment point of the frame to the trailer. In a second embodiment, the air spring is generally vertically aligned with the attachment point. The frame in each embodiment includes a first subassembly fixed relative to the trailer, which has the structure for attaching the frame to the trailer thereon, and a second subassembly fixed relative to the tow vehicle, which has the structure for attaching the frame to the tow vehicle thereon. The first and second subassemblies are connected together such that the subassemblies can move relative to each other. The air spring is provided between the subassemblies such that when the subassemblies move relative to each other in response to movement by the tow vehicle and trailer over obstructions in the road, the air spring provides a cushion between the trailer and the tow vehicle. A dampening shock is provided in each embodiment between the subassemblies for compensating for a reverse motion of the air spring.

In the offset embodiment of the assembly, the first and second subassemblies are connected together by a pivot structure, as shown, or by a sliding structure. The air spring provides a cushion between the subassemblies when they pivot, as shown, or slide in response to a movement of the tow vehicle and trailer over obstructions in the road, thereby providing a cushion between the tow vehicle and trailer.

In the vertical embodiment of the assembly, the first subassembly includes a tube which is fixed relative to the trailer, and the second subassembly which includes a piston member fixed relative to the tow vehicle. The piston member is held within the tube and is movable relative thereto. The air spring is mounted between the piston member and the trailer for providing a cushion between the subassemblies when they move relative to each other in response to a movement of the tow vehicle and trailer over an obstruction in the road, thereby providing a cushion between the tow vehicle and the trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 2 is a perspective view of the novel pneumatic isolator stabilizing system which incorporates the features of the first embodiment of the invention;

3

Figure 4:
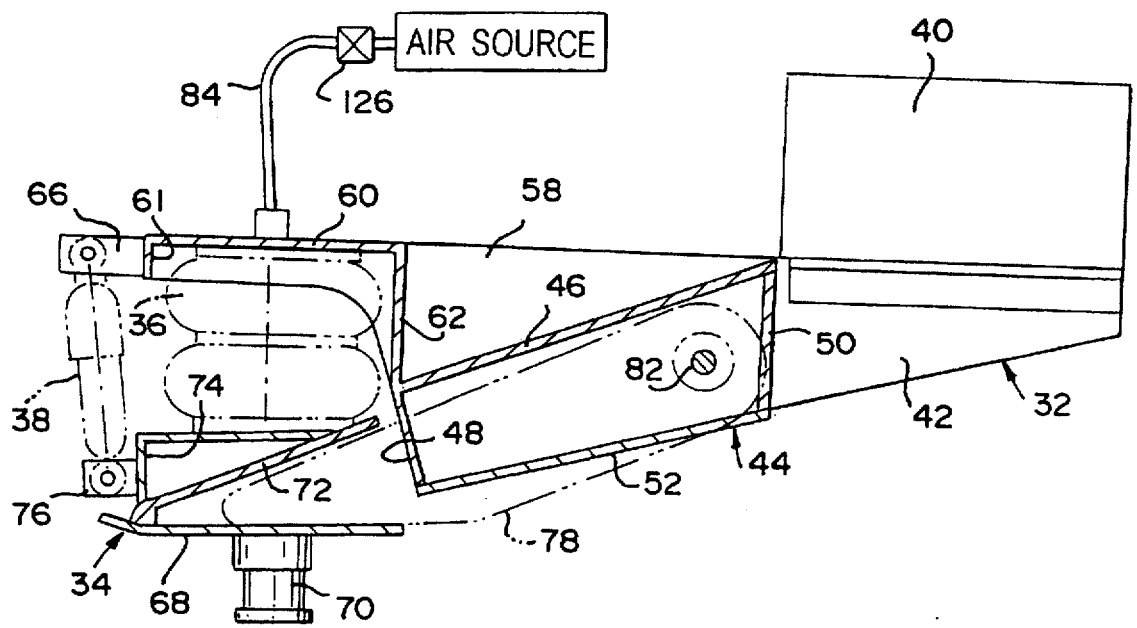
Figure 5:
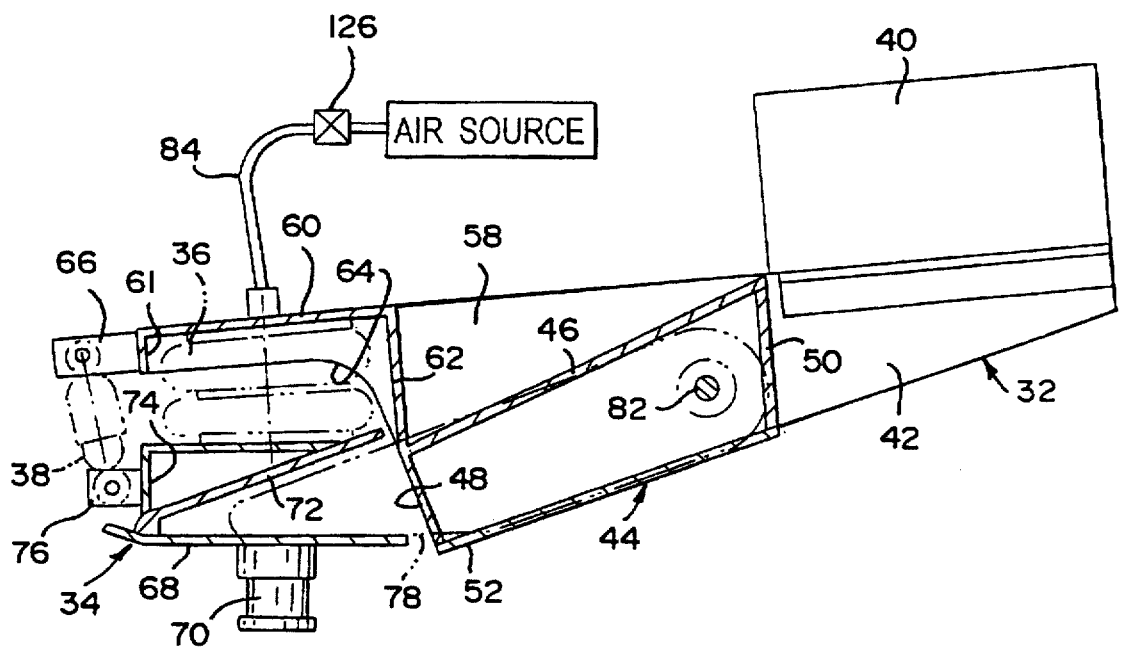
Figure 6:
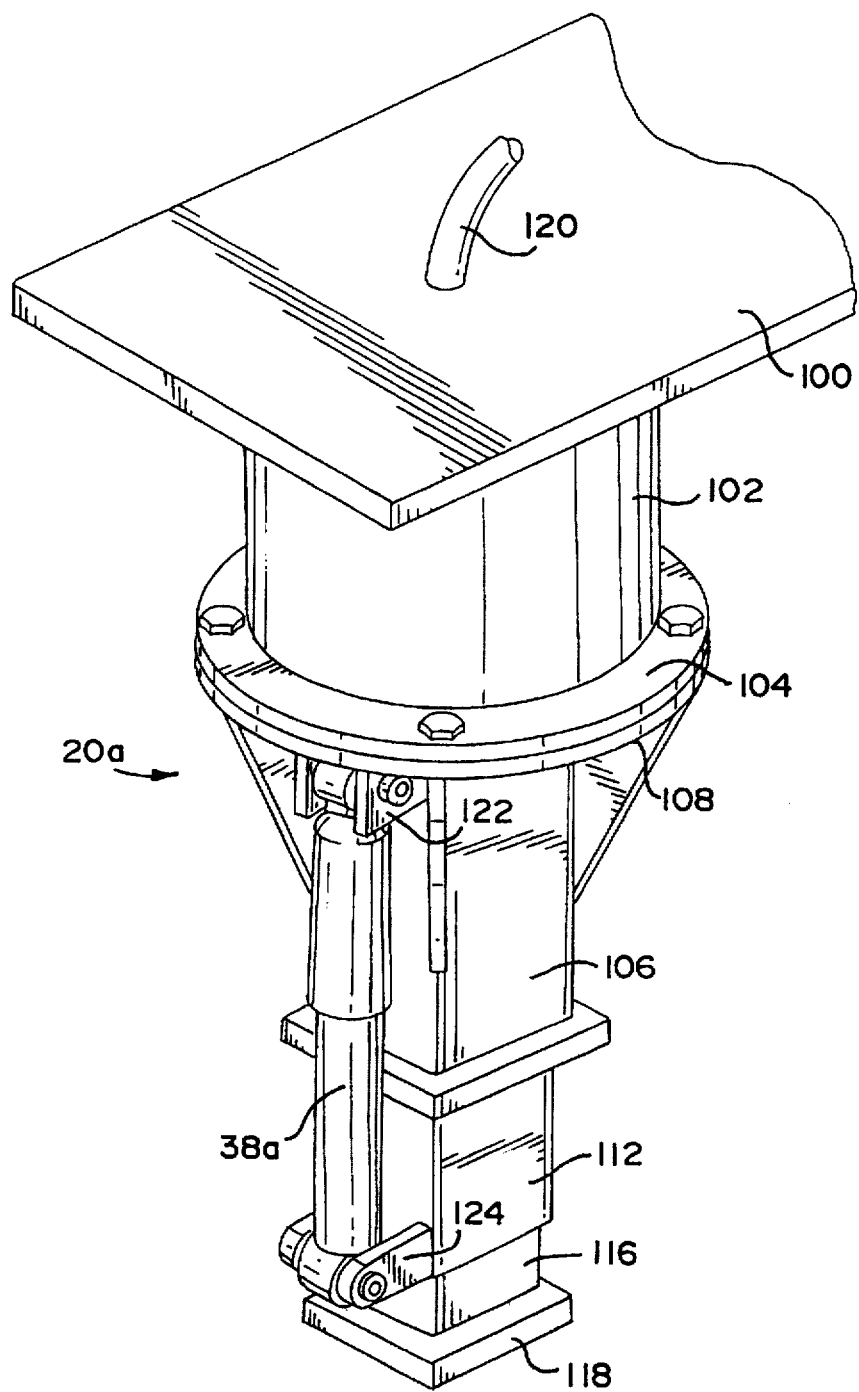

FIG. 3 is a partially exploded perspective view of the components of the pneumatic isolator stabilizing system shown in FIG. 2;

FIG. 4 is a cross-sectional view of the pneumatic isolator stabilizing system shown in FIG. 2 in a first position;

FIG. 5 is a cross-sectional view of the pneumatic isolator stabilizing system shown in FIG. 2 in a second position;

FIG. 6 is a perspective view of the novel pneumatic isolator stabilizing system which incorporates the features of the second embodiment of the invention;

FIG. 7 is a side elevational view, shown partially in cross-section, of the pneumatic isolator stabilizing system shown in FIG. 6 in a first position; and FIG. 8 is a side elevational view, shown partially in cross-section, of the pneumatic isolator stabilizing system shown in FIG. 6 in a second position.

DETAILED DESCRIPTION OF THE PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1A:
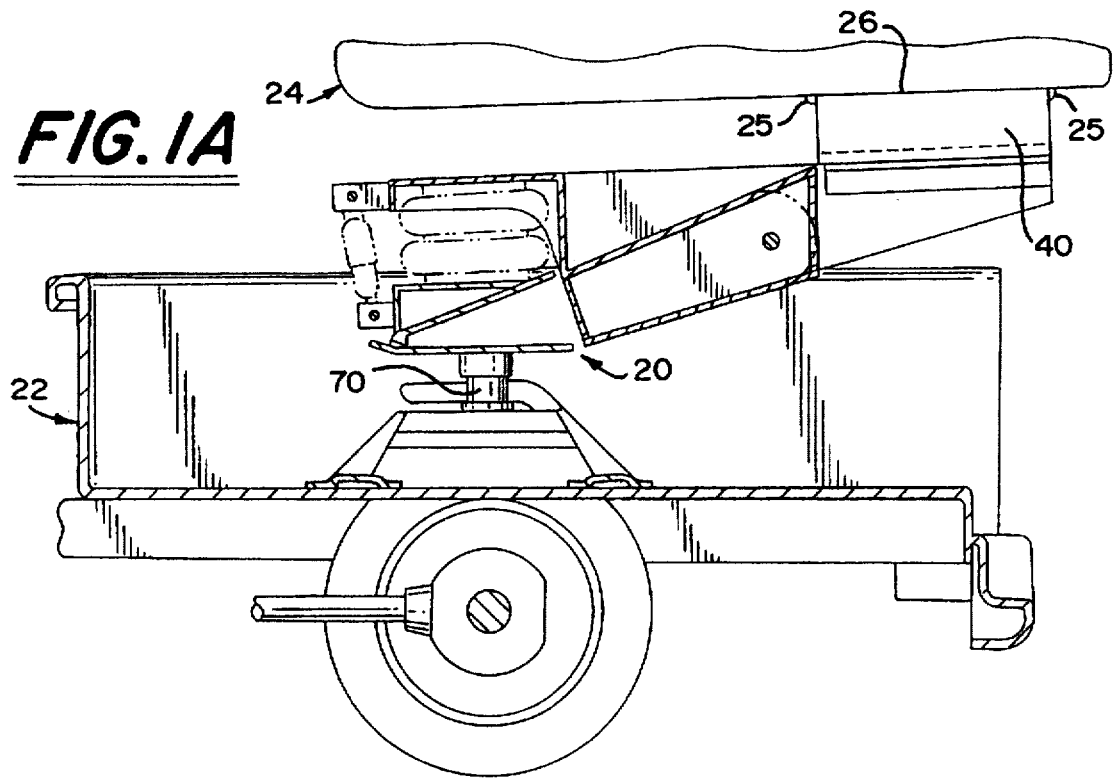
FIG. 1A is a cross-sectional view of a tow vehicle and a side elevational view of a trailer which has a novel pneumatic isolator stabilizing system which incorporates the features of a first embodiment of the invention mounted therebetween and shown in cross-section.
Figure 1B:
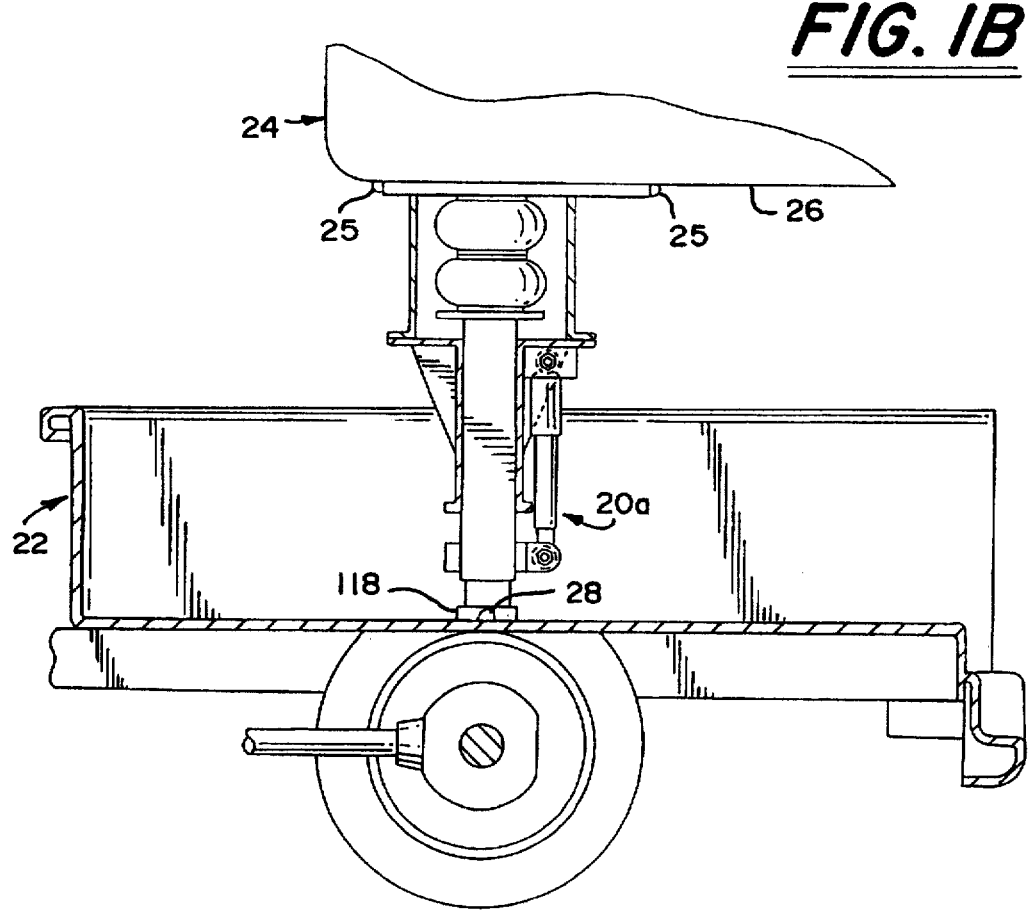
FIG. 1B is a cross-sectional view of a tow vehicle and a side elevational view of a trailer which has a novel pneumatic isolator stabilizing system which incorporates the features of a second embodiment of the invention mounted therebetween and shown in cross-section.

The present invention is directed to a novel pneumatic isolator stabilizing assembly 20, 20a which is incorporated between a tow vehicle 22, such as a pick-up truck, and a trailer 24, such as a camper or a horse trailer, FIGS. 1A and 1B. The assembly 20, 20a of the present invention compensates for various load conditions when towing a heavy trailer 24 or an empty trailer 24 over the roads. The assembly 20, 20a can be set to soften the contact between a hitch point in the bed of the tow vehicle 22 and the trailer 24. This dampens the impact loads on the tow vehicle 22 and the trailer 24 and reduces the potential damage. The novel assembly 20, 20a reduces the dynamics of the trailer gooseneck to the tow vehicle frame and suspension, thereby providing driver and passenger comfort.

The assembly 20, 20a of the present invention is permanently attached to the trailer frame 26, such as by welding 25 or by bolts, and is coupled to the tow vehicle 22 by a king pin 70 for the first embodiment, a ball for the second embodiment. A first embodiment of the novel pneumatic isolator stabilizing assembly 20, which is described herein as the "offset" assembly 20, is shown in FIGS. 1A and 2-5 and second embodiment of the novel assembly 20a, which is described herein as the "vertical" assembly 20a, is shown in FIGS. 1B and 6-8. Like elements in each embodiment are denoted by like reference numerals with the elements of the second embodiment having the suffix "a" thereafter.

Attention is now directed to FIGS. 2-5 which show the specifics of the offset assembly 20. The offset assembly 20 includes a frame 30 which has a first subassembly 32 which is rigidly attached to the trailer 24 and a second subassembly 34 with king pin 70 that is mounted to the bed of the tow vehicle 22. As shown, the first and second subassemblies 32, 34 of the frame 30 are hingedly connected to each other such that the subassemblies 32, 34 can move relative to each other. It is envisioned that other means for allowing movement between the subassemblies 32, 34 may be provided, such as a sliding structure wherein the first subassembly 32 slides relative to the second subassembly 34. An expandable and compressible air spring 36, which may be provided by an air bag or other suitable means that regulates the compression and expansion rates, and a conventional dampening shock absorber 38 are mounted between the subassemblies 32, 34. This embodiment is called an "offset" assembly 20 because the air spring 36 is offset from the point of attachment of the assembly 20 from the trailer 24.

The first subassembly 32 is formed from a plurality of metal plates which are welded or otherwise suitably affixed to each other. A pair of trailer attachment arms 40 have upper ends that are each permanently attached to the underside of the front of the trailer frame 26 by bolts or by welding. The lower end of the trailer attachment arms 40 are each fixedly connected to respective mounting arms 42, 43 by suitable means, such as welding.

The mounting arms 42, 43 are attached to a box-like center member 44 which is formed from a top plate 46, front and rear plates 48, 50 which depend downwardly from the top plate 46, a bottom plate 52 which attaches to the bottom of the front and rear plates 48, 50. The mounting arms 42, 43 are respectively attached to the opposite sides of the top plate 46 to close the sides of the center member 44. As shown in FIG. 4, the mounting arm 42 extends rearwardly of the center member rear plate 50; similarly, mounting arm 43 extends rearwardly of the center member rear plate 50. The trailer attachment arms 40 are attached to the mounting arms 42, 43 along the length thereof that extends rearwardly of the center member rear plate 50. The center member 44 and the portion of the mounting arms 42, 43 that are attached thereto are angled relative to the attachment arms 40. A bore 54 is provided through each of the mounting arms 42, 43 at a position which is spaced from the attachment point of the trailer attachment arms 40 for reasons described herein.

An upper member 56 is attached to a top surface of the center member top plate 46 and extends therefrom at an angle. The upper member 56 is formed from a pair of side arm plates 58 that are spaced apart from each other by top and front plates 60, 61 that are welded therebetween. A rear portion of each side arm plate 58 is welded to the center member top plate 46. The top plate 60 is positioned along a front portion of the side arm plates 58. A back plate 62 is also welded between the side arm plates 58 and is generally perpendicular to the top plate 60. The back plate 62 extends from the junction between the top plate 60 and the side arm plates 58 to the junction between the center member top plate 46 and the front plate 48. A surface 64 of each side arm plate 58 proximate to the point where each plate 58 joins with the center member top plate 46 is curved.

A pair of mounting ears 66 extend outwardly from the front plate 61 for pivotally mounting an upper end of the shock absorber 38 thereto by suitable means, such as a pin that extends through apertures in each of the ears 66 and through a top portion of the shock absorber 38. An upper end of the air spring 36 is attached to the underside of the top plate 60 by suitable means, such as by bolting.

The second subassembly 34 of the frame 30 is also formed from a plurality of metal plates which are welded or otherwise suitably affixed to each other. A base plate 68 is welded to the king pin 70 provided on the tow vehicle 22. The base plate 68 remains substantially parallel to the fifth wheel mounted in the bed of the tow vehicle 22 during operation over the roads. A center plate 72 is rigidly attached to the base plate 68 and extends upwardly therefrom and at an angle relative thereto. The front end of the center plate 72 is curved at the point of attachment to the base plate 68.

An L-shaped plate 74, which has first and second sections that are perpendicular to each other, is rigidly attached to the center plate 72 at the ends thereof such that a space is provided between the L-shaped plate 74 and the center plate 72. The first section of the L-shaped plate 74 is generally parallel to the base plate 68 and the second section is generally perpendicular to the base plate 68. The bottom end of the air spring 36 is fixed to the first section of the L-shaped plate 74 by suitable means, such as bolts.

A pair of mounting ears 76 extend outwardly from the second section for pivotally mounting a lower end of the shock absorber 38 thereto by suitable means, such as a pin that extends through apertures in each of the ears 76 and through a bottom portion of the shock absorber 38. A lower end of the air spring 36 is attached to the top surface of the L-shaped plate 74. It is envisioned that the center plate 72 could be modified so as to provide a planar surface to which the bottom end of the air spring 36 could be fixed such that the L-shaped plate 74 is eliminated, and a front plate rigidly attached to the base plate 68 and provides a mounting surface for the mounting ears 76.

A pair of outside pivot arms 78 each have an end which is rigidly connected to the base plate 68 and the center plate 72 on opposite sides thereof. Each pivot arm 78 projects from the base plate 68 and the center plate 72 a predetermined distance and overlaps the respective outer surfaces of the mounting arms 42, 43. A bore 80 is provided through each pivot arm 78 and aligns with the bores 54 provided through the respective mounting arms 42, 43.

The second subassembly 34 of the frame 30 pivots relative to the first subassembly 32 on a shaft 82 provided through bearing hubs on the pivot arms 78 and the mounting arms 42, 43 of the first subassembly 32. The shaft 82 extends the full width of the assembly 20, is thereby eliminating torsion. The bearing hubs in the mounting arms 42, 43 and the pivot arms 78 provide a mounting for the shaft 82 which is held therein by suitable means.

When the first and second subassemblies 32, 34 of the frame 30 are connected together by the shaft 82, the inner surface of each pivot arm 78 sits against the outer surface of the mounting arms 42, 43 and the upper end of the center plate 72 generally sits against front plate 48 or the curved surface 64 of the side arms 58.

As discussed, the air spring 36 is provided between the first and second subassemblies 32, 34 of the frame 30 and specifically, between the top plate 60 and the L-shaped plate 74 such that the upper end of the air spring 36 is fixed to the underside of the top plate 60 and to the upper surface of the L-shaped plate 74. Air is supplied to the air spring 36 from an external source, such as an air pump or an auxiliary air compressor, through a tube 84 connected to the source and connected to the air spring 36. As shown, the tube 84 extends to the fitting on the top plate 60 into the air spring 36. The pressure for the air spring 36 can be monitored visually or by an air pressure gauge. The pressure setting will vary based on the load and the air spring 36 used for the application, and the desired ride characteristics of the driver.

Also, as discussed hereinabove, the dampening shock absorber 38 is mounted is provided between the first and second subassemblies 32, 34 of the frame 30 and is specifically, the upper end of the shock absorber 38 is pivotally mounted to the mounting ears 66 and the lower end of the shock absorber 38 is pivotally mounted to the mounting ears 76. The shock absorber 38 compensates for the reverse motion of the air spring 36 as described herein.

Now that the specifics of the novel offset assembly 20 have been described, a description of how the assembly 20 operates is provided. The operation is described with respect to the tow vehicle 22 and trailer 24 being driven over a bump in the road.

When the rear end of the tow vehicle 22 moves upwardly as a result of the wheels passing over a bump in the road, the weight of the front end of the trailer 24 presses downwardly on the offset assembly 20 and causes the air spring 36 to compress such that the first and second subassemblies 32, 34 of the frame 30 pivot relative to each other along the shaft 82 and the upper member 56 moves closer to the L-shaped plate 74 and the center plate 72. The pivot arms 78 rotate relative to the respective mounting arms 42, 43. The shock absorber 38 also compresses.

After the wheels of the tow vehicle 22 have passed completely over the bump and before the wheels of the trailer 24 contact the bump, the front end of the trailer 24 moves upwardly which causes the air spring 36 to expand, but the shock absorber 38 dampens the travel of the air spring 36 from expanding too rapidly. The first and second subassemblies 32, 34 of the frame 30 pivot relative to each other along the shaft 82 and the upper member 56 moves away from the L-shaped plate 74. The pivot arms 78 rotate relative to the respective mounting arms 42, 43. The mounting arms 42, 43 assure smooth operation of the assembly 20 and act like wear plates.

Likewise, when the rear wheels of the trailer 24 contact the bump, the front end of the trailer 24 moves downwardly relative to the tow vehicle 22 causing the first and second subassemblies 32, 34 of the frame 30 to pivot relative to each other along the shaft 82. The air spring 36 compresses and the pivot arms 78 pivot about the respective mounting arms 42, 43. The shock absorber 38 contracts.

After the wheels of the trailer 24 pass completely over the bump, the front end of the trailer 24 once again moves upwardly and the air spring 36 expands, but the shock absorber 38 dampens the travel of the air spring 36 from expanding too rapidly. The first and second subassemblies 32, 34 of the frame 30 pivot relative to each other along the shaft 82. The pivot arms 78 rotate about the respective mounting arms 42, 43. The mounting arms 42, 43 assure smooth operation of the assembly 20.

As a result of this operation, the offset assembly 20 isolates the tow vehicle 22 and the trailer 24 to optimize the ride handling characteristics, preserve the payload and provide driver and passenger comfort. The ride is controlled by varying the air spring 36 and pressure setting and the amount of pivoting that can occur between the subassemblies 32, 34 is based on the characteristics of the air spring 36. It is to be understood that the offset assembly 20 will vary based on the distance and angle for attaching to the trailer frame 26 and the coupler on the tow vehicle 22.

Attention is now directed to FIGS. 6–8 which show the specifics of the vertical assembly 20a. The vertical assembly 20a includes a frame 30a which has a first subassembly 32a which is rigidly attached to the trailer 24 and a second subassembly 34a which is rigidly attached to the hitch ball 28 on the tow vehicle 22. The first and second subassemblies 32a, 34a are interconnected, as described herein, such that the subassemblies 32a, 34a move relative to each other. The air spring 36a, identical to that provided in the offset assembly 20, and the conventional dampening shock absorber 38 are mounted between the first and second subassemblies 32a, 34a. This embodiment of the assembly is called a "vertical" assembly 20a because the air spring 36a is aligned with the point of attachment of the assembly 20a to the trailer 24.

The first subassembly 32a is formed from a plurality of metal members connected together and includes an upper mounting plate 100 which is permanently mounted on the underside of the front end of the trailer frame 26. A circular tube 102 is attached to the underside of the mounting plate 100. The tube 102 has a circular flange 104 extending outwardly from the bottom end thereof.

An outer, lower tube 106 is connected to the underside of the flange and has a circular flange 108 that extends outwardly from a top end thereof such that the circular flange 108 sits against the circular flange 104. The circular flanges 104, 108 are equipped with bolt holes and bolts are placed therethrough for connecting the outer tube 106 and the circular tube 102 together. The outer tube 106 has a maximum internal diameter that is less than the internal diameter of the circular tube 102. Therefore, a cavity 110 is formed between the circular flange 104, the tube 102 and the mounting plate 100. Tubes 102, 106 and flanges 104, 108 form a housing.

The second subassembly 34a of the frame 30a is formed from a plurality of metal members connected together and includes a piston member or tube 112 that extends through the outer tube 106 of the first subassembly 32a and is slidable relative thereto. The piston tube 112 has a plate 114 at one end thereof that is seated in the cavity 110. The plate 114 has a diameter which is larger than the diameter of the passageway through the outer tube 106 such that the plate 114 is captured in the cavity 110.

A tube 116 is mounted within the piston tube 112 at the opposite end from the plate 114. The tube 116 is used to adjust the length of the vertical assembly 20a when the assembly 20a is initially installed between the tow vehicle 22 and the trailer 24. The tube 116 is provided with suitable means, such as bolts, that releasably fix the tube 116 relative to the piston tube 112. The tube 116 can be adjusted relative to the piston tube 112 by sliding the tube 116 along its length within the piston tube 112 such that the length of the vertical assembly 20a can be initially lengthened or shortened when installed between the tow vehicle 22 and the trailer 24. Thereafter, the bolts are used to fix the tube 116 relative to the piston tube 112 during operation of the tow vehicle 22 and trailer 24. The tube 116 can be fixed to the piston tube 112 in various locations based on the distance from the hitch point of the tow vehicle 22 to the underside of the trailer 24. The tubes 112, 116 and suitable means for fixing the tube 112, 116 relative to each other form a piston assembly. A coupler 118 is welded on the end of the tube 116 opposite to the point of attachment to the piston tube 112 for attaching the assembly 20a to the ball hitch 28 in the bed of the tow vehicle 22.

The air spring 36a is mounted within the cavity 110 and is connected between the plate 114 on the piston tube 112, by being suitably affixed thereto such as by bolting, and the mounting plate 100, by being suitably affixed thereto such as by bolting, such that the circular tube 102 encloses the air spring 36a therein. The tube 102 depth and diameter are based on the air spring 36a dimensions such that the internal diameter of the cavity 110 will allow the air spring 36a to expand and contract and operate in all conditions. The outer tube 106 allows the piston tube 112 to float therein in an upward and downward movement as described herein. The travel of the piston tube 112 is controlled by the air spring pressure and the plate 114 on the piston tube 112 bottoming on the circular flange 108.

The air spring 36a is bolted to the underside of the upper mounting plate 100. The upper mounting plate 100 is provided with a clearance aperture for plumbing the air to the air spring 36a. Air is supplied for a tube 120 which leads to the air source from the air spring 36a. The air pressure in the air spring 36a is controlled from an outside source or an isolated air compressor. The pressure in the air spring 36a controls the ride characteristic.

The dampening shock absorber 38a is mounted between the first and second subassemblies 32a, 34a of the vertical assembly. Specifically, mounting ears 122 are provided on the outer tube 106 for mounting the top of the shock absorber 38a thereto and mounting ears 124 are provided on the piston tube 112 for mounting the bottom of the shock absorber 38a thereto. The shock absorber 38a compensates for the reverse motion of the air spring 36a.

Now that the specifics of the novel vertical assembly 20a have been described, a description of how the assembly 20a operates is provided. The operation is again described with respect to the tow vehicle 22 and trailer 24 being driven over a bump in the road.

When the rear end of the tow vehicle 22 moves upwardly as a result of the wheels passing over a bump in the road, the weight of the front end of the trailer 24 presses downwardly on the vertical assembly 20a and causes the piston tube 112 to slide upwardly along the length of the outer tube 106 and to compress the air spring 36a. The air spring 36a compresses between the plate 114 on the piston tube 112 and the mounting plate 100 such that the piston plate 114 moves closer to the mounting plate 100. The shock absorber 38a also compresses.

After the wheels of the tow vehicle 22 have passed completely over the bump and before the rear wheels of the trailer 24 contact the bump, the front end of the trailer 24 moves upwardly which causes the piston tube 112 to slide downwardly and causes the air spring 36a to expand. The shock absorber 38a dampens the travel of the air spring 36a. The piston tube 112 slides within the outer tube 106 such that the plate 114 moves away from the mounting plate 100. The air spring 36a can continue to expand until the plate 114 bottoms out on the flange 108 as shown in FIG. 8.

Likewise, when the rear wheels of the trailer 24 contact the bump, the front end of the trailer 24 moves downwardly relative to the tow vehicle 22 causing the first and second subassemblies 32a, 34a to move relative to each other. The air spring 36a compresses as the piston tube 112 slides upwardly within the outer tube 106 such that the plate 114 moves closer to the mounting plate 100. The shock absorber 38a also contracts.

After the rear wheels of the trailer 24 pass completely over the bump, the front end of the trailer 24 moves upwardly relative to the tow vehicle 22 causing the air spring 36a to expand, but the shock absorber 38a dampens the travel of the air spring 36a. The first and second subassemblies 32a, 34a move relative to each other as the piston tube 112 slides downwardly within the outer tube 106 and the plate 114 moves away from the mounting plate 100. The air spring 36a can continue to expand until the plate 114 bottoms out on the flange 108 as shown in FIG. 8.

In this embodiment of the assembly 20a, the amount of movement that the piston tube 112 can move relative to the outer tube 106 is defined. The piston tube 112 can only move toward the mounting plate 100 to the extent that the air spring 36a allows the piston tube 112 to compress it. This is controlled by the characteristics of the air spring 36a and the air pressure therein. The piston tube 112 can only move away from the mounting plate 100 to the point where the piston plate 114 contacts the circular flange 108 provided on the outer tube 106.

As a result of this operation, the vertical assembly 20a isolates the tow vehicle 22 and the trailer 24 to optimize the ride handling characteristics, preserve the payload and provide driver comfort. The ride is controlled by varying the air spring 36a and pressure setting.

The offset or vertical embodiments 20, 20a of the pneumatic isolator stabilizing system of the present invention use a single air spring 36, 36a. The source of air for the air spring 36, 36a is provided by an optional air compressor contained within the tow vehicle 22 or manually provided by an air pump.

The advantage of using an air compressor contained within the trailer 24 is that this allows the driver to control the setting from the dash board to provide an ideal ride characteristic. One such air compressor system includes a 12 Volt compressor, a storage tank, a 120 p.s.i. pressure switch, tubing and fittings. A valve 126, 126a may also be used to control the air flow to the source and vice-versa.

The external source would be supplied from an air pump. The air pressure can be increased or reduced by bleeding the system at the air pressure inflation fitting.

While preferred embodiments of the present invention are shown and described, it is envisioned that those skilled in the art may devise various modifications of the present invention without departing from the spirit and scope of the appended claims.

The invention claimed is:

1. An assembly for providing a connection between a tow vehicle and a trailer such that the trailer can be towed by the tow vehicle using the assembly as the connection and said assembly for compensating for various load conditions when towing a heavy trailer or an empty trailer over a road, said assembly comprising: a frame including a vertical housing dated to be fixed relative to one of the tow vehicle or the trailer and a piston member adapted to be fixed relative to the other of the tow vehicle or the trailer, said piston member being disposed within said housing and axially slidably therein; first mounting means for mounting said frame on the tow vehicle; second mounting means for modulating said frame on the trailer; and cushion means mounted within said housing and between said piston member and one of said mounting means for resiliently, yieldably permitting said piston member to axially slide within said housing and for providing a cushion between the tow vehicle and the trailer when the tow vehicle and the trailer are traveling over the road.

2. An assembly as defined in claim 1, wherein said cushion means comprises an air spring.

3. An assembly as defined in claim 2, wherein said air spring is supplied by an air compressor or from an external air source.

4. An assembly a defined in claim 1, further including a dampening shock provided on said frame for compensating for a reverse motion of said cushion means.

5. An assembly as defined in claim 1, wherein said cushion means is generally vertically aligned with said second mounting means.

6. An assembly as defined in claim 1, wherein said first mounting means is used for mounting said housing on the tow vehicle and said second mounting means is used for mounting said piston member on the trailer.

7. The assembly of claim 1 in combination with a trailer and a pick-up truck, wherein said pick-up truck comprises said tow vehicle, said assembly being mounted to a bed of said pick-up truck.

8. The assembly of claim 1 in combination with a trailer, wherein said assembly is permanently mounted to said trailer by said second mounting means.

9. A connection assembly for providing a connection between a tow vehicle and a trailer such that the trailer can be towed by the tow vehicle using the connection assembly as the connection and said connection assembly for compensating for various load conditions when towing a heavy trailer or an empty trailer over a road, said connection assembly comprising: a frame including a vertical housing adapted to be fixed relative to one of the tow vehicle or the trailer and piston assembly adapted to be fixed relative to the other of the tow vehicle or the trailer, said piston assembly being disposed within said housing and axially slidably therein; first mounting means for mounting said frame on the tow vehicle; second mounting means for mounting said frame on the trailer; and cushion means mounted between said piston assembly and one of said mounting means for resiliently, yieldably permitting said piston assembly to axially slide within said housing and for providing a cushion between the tow vehicle and the trailer when the tow vehicle and the trailer are traveling over the road, the length of said piston assembly being adjustable for varying the total length of the connection assembly.

* * * * *

UNITED STATES PATENT AND TRADEMARK OFFICE
CERTIFICATE OF CORRECTION

PATENT NO.  : 5,785,341
DATED       : July 28, 1998
INVENTOR(S) : E. Dale Fenton It is certified that error appears in the above-identified patent and that said Letters Patent is hereby corrected as shown below:

Column 9, Line 32 "dated" should be -- adapted --

Signed and Sealed this

Sixteenth Day of February, 1999

Attest:

Attesting Officer

Acting Commissioner of Patents and Trademarks

UNITED STATES PATENT AND TRADEMARK OFFICE
CERTIFICATE OF CORRECTION

PATENT NO.   : 5,785,341
DATED        : July 28, 1998
INVENTOR(S)  : E. Dale Fenton It is certified that error appears in the above-identified patent and that said Letters Patent is hereby corrected as shown below:

<u>Column 9</u>,
Line 38, "modulating" should be -- mounting --

Signed and Sealed this

Fourth Day of December, 2001

Attest:

*Attesting Officer*

NICHOLAS P. GODICI
*Acting Director of the United States Patent and Trademark Office*